Aug. 24, 1943. J. D. BOLESKY 2,327,336
CONTROL DEVICES
Filed April 5, 1939 6 Sheets-Sheet 1

John D. Bolesky,
Inventor,
Haynes, Koenig and Wolf,
Attorneys.

Aug. 24, 1943.  J. D. BOLESKY  2,327,336
CONTROL DEVICES
Filed April 5, 1939  6 Sheets-Sheet 2
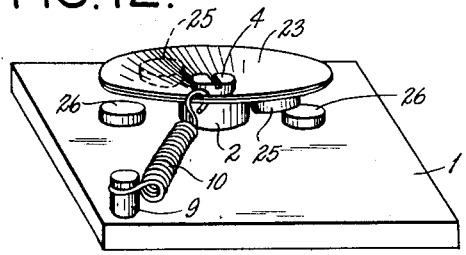
FIG. 12.
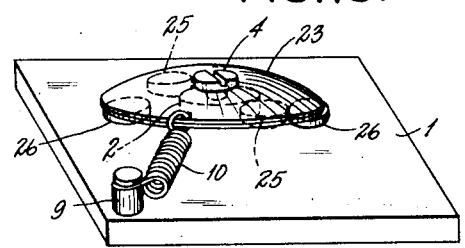
FIG. 13.
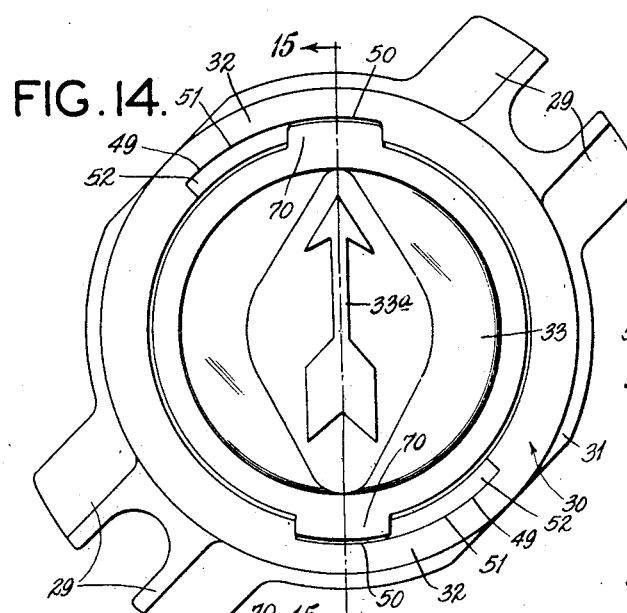
FIG. 14.
FIG. 15.
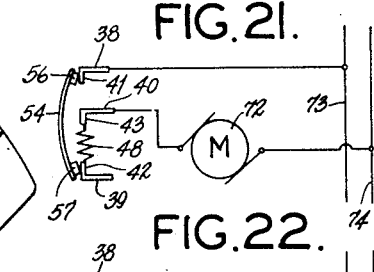
FIG. 21.
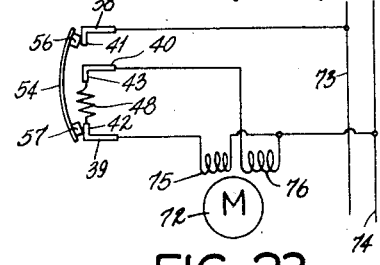
FIG. 22.
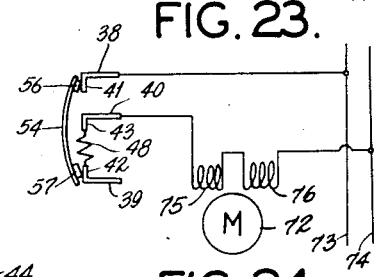
FIG. 23.
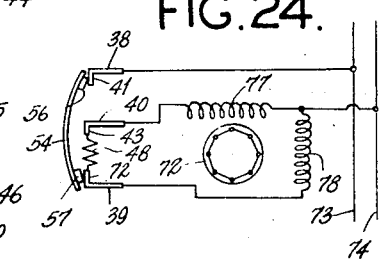
FIG. 24.
John D. Bolesky,
Inventor,
Haynes, Koenig and Wolf
Attorneys.

Aug. 24, 1943.　　　J. D. BOLESKY　　　2,327,336
CONTROL DEVICES
Filed April 5, 1939　　　6 Sheets-Sheet 3
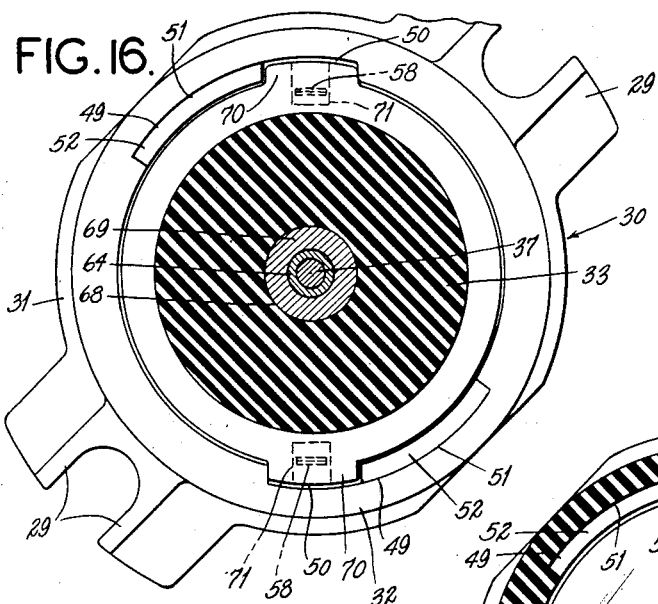
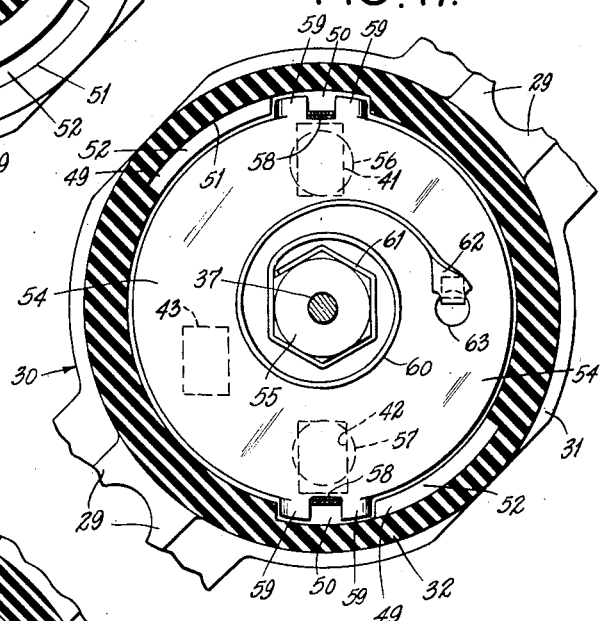
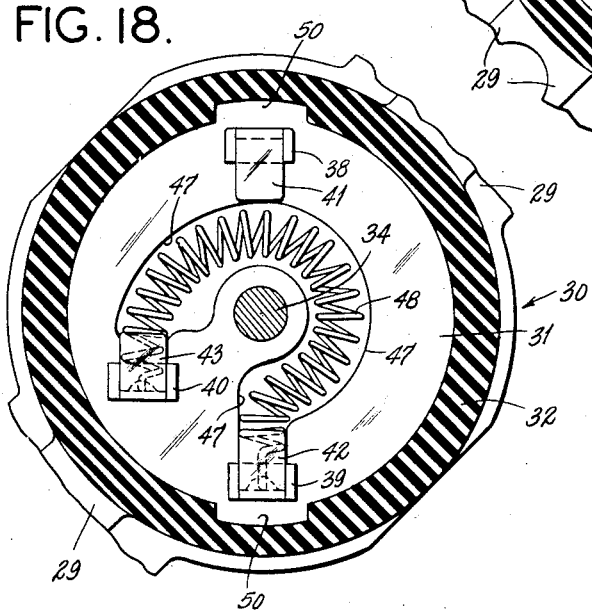
John D. Bolesky,
Inventor,
Haynes, Koenig and Wolf
Attorneys.

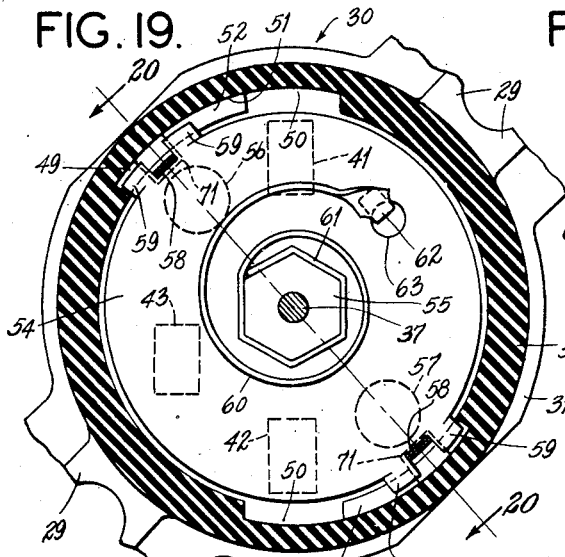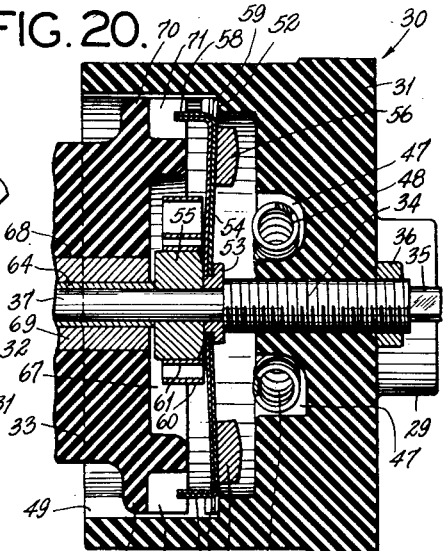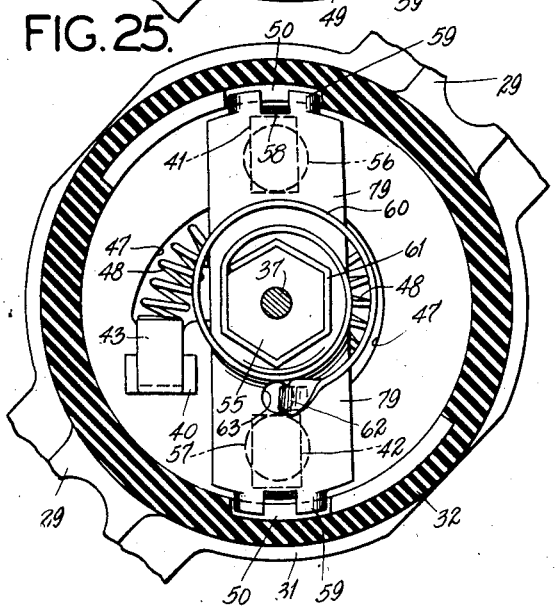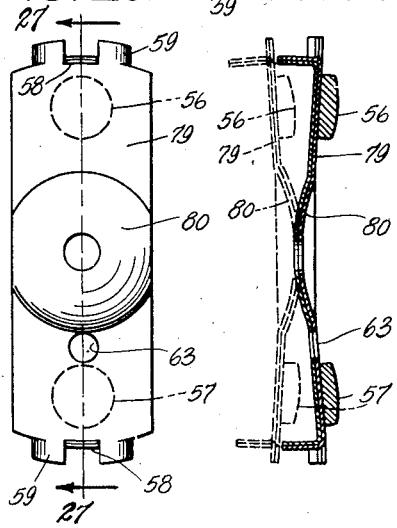

Aug. 24, 1943.    J. D. BOLESKY    2,327,336
CONTROL DEVICES
Filed April 5, 1939    6 Sheets-Sheet 5

John D. Bolesky,
Inventor,
Haynes, Koenig and Wolf
Attorneys.

Aug. 24, 1943.    J. D. BOLESKY    2,327,336
CONTROL DEVICES
Filed April 5, 1939    6 Sheets-Sheet 6

John D. Bolesky, Inventor,
Haynes, Koenig and Wolf,
Attorneys.

Patented Aug. 24, 1943

2,327,336

UNITED STATES PATENT OFFICE 2,327,336

CONTROL DEVICE

John D. Bolesky, Attleboro, Mass., assignor to Metals & Controls Corporation, Attleboro, Mass., a corporation of Massachusetts Application April 5, 1939, Serial No. 266,078

40 Claims. (Cl. 200—138)

This invention relates to control devices, and, with regard to certain more specific features, to electric snap switches and valves, for example, of both thermally and manually actuated types.

Among the several objects of the invention may be noted the provision of a control device of the class described, which is capable of automatic operation to one controlling condition, but which is incapable of automatic operation to a second controlling condition, requiring manual actuation therefor; the provision of a control device, such as an electric switch, which can be used both to connect and disconnect a motor or other electrical device in whose circuit it is connected; the provision of a thermally responsive switch of the class described which in case of excess currents being drawn by the motor (or other electrical device) will automatically break the circuit connections to the device; the provision of a thermally responsive control device of the class described which requires manual resetting in order again to actuate the device; the provision of an electric switch of the class described which is so constructed as to include novel means for preventing the formation of contact-destroying arcs; and the provision of control devices of the class described which are relatively economical to make, and safe in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is an isometric view of a thermostatic electric switch of simple form embodying the present invention;

Figures 2 and 3 are vertical cross sections taken substantially along lines 2—2 and 3—3 of Fig. 1;

Figures 12 and 13 are isometric views similar to Fig. 10, illustrating alternative positions of the switch of Fig. 10;

Fig. 14 is a top plan view of a third form of switch embodying the present invention;

Fig. 15 is a vertical cross section taken substantially along line 15—15 of Fig. 14;

Figure 28:
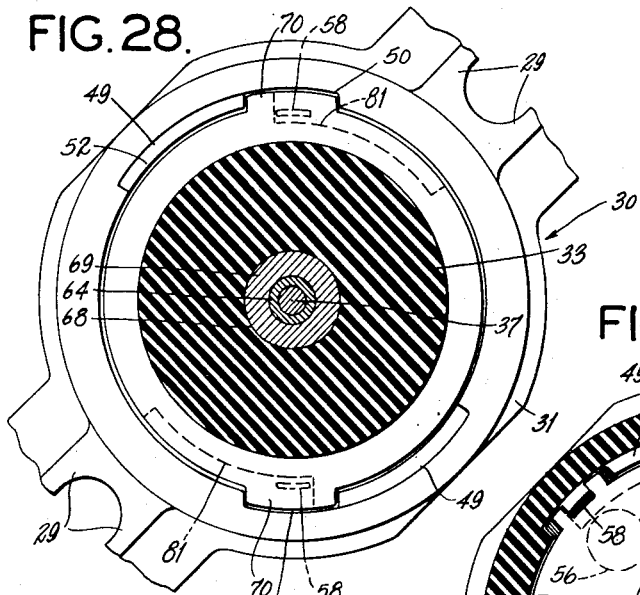
Figure 29:
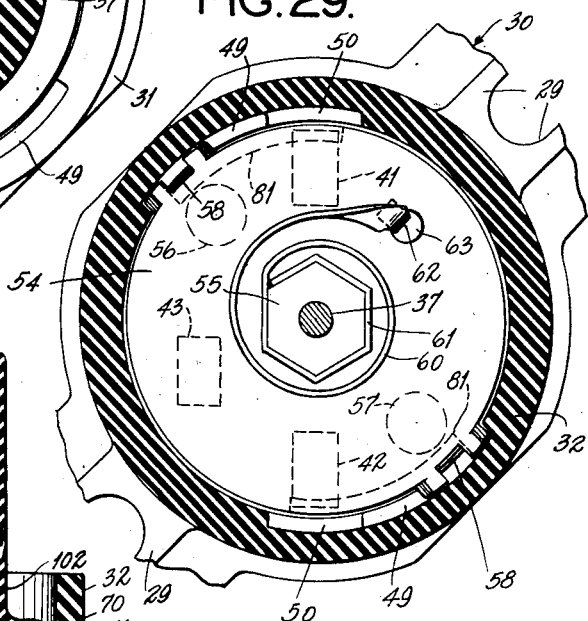
Figure 30:
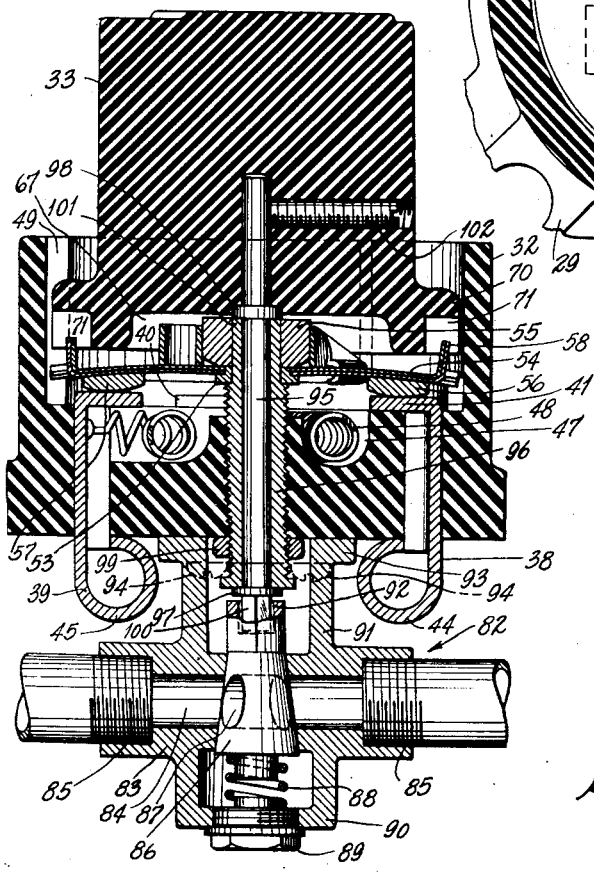
Figure 31:
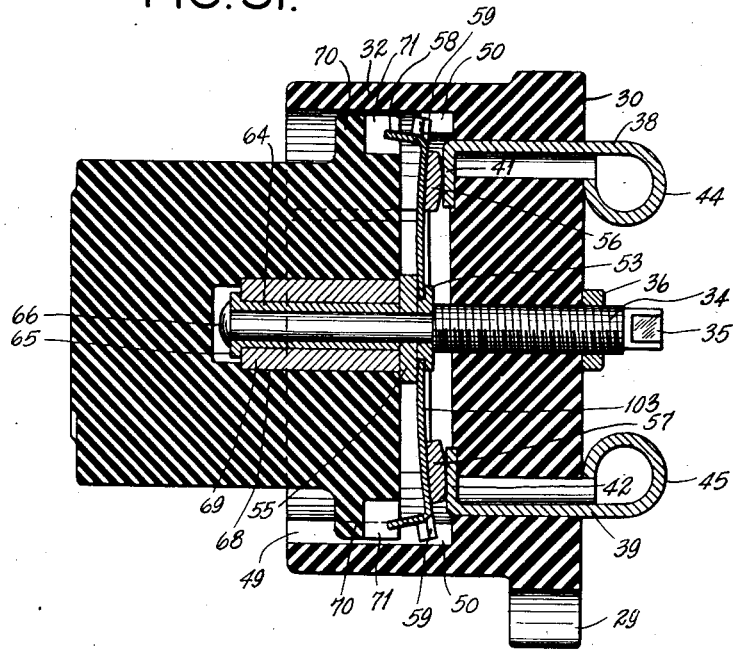
Figure 32:
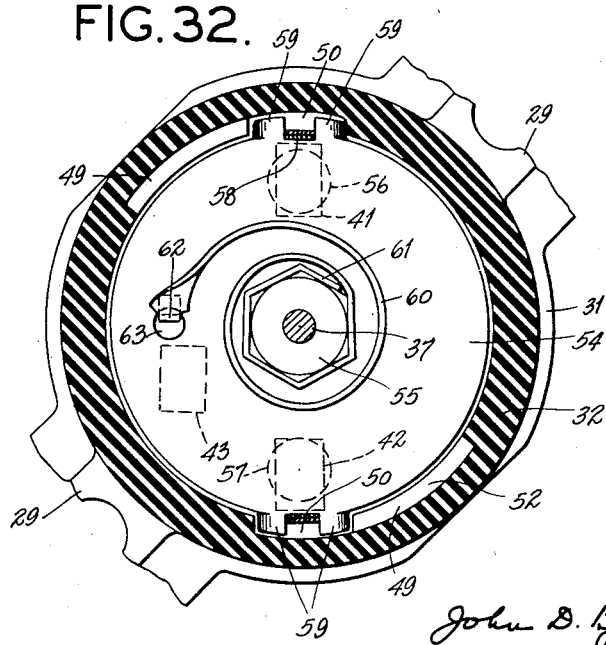

Figures 16, 17 and 18 are cross sections taken substantially along lines 16—16, 17—17 and 18—18, respectively of Fig. 15;

Fig. 19 is a view similar to Fig. 17, illustrating an alternative operating position of the Fig. 14 switch;

Fig. 20 is a vertical cross section taken substantially along line 20—20 of Fig. 19;

Figures 21, 22, 23 and 24 are electrical circuit diagrams showing certain uses of switches made in accordance with the present invention;

Fig. 25 is a cross section similar to Fig. 17, illustrating a fourth switch embodiment of the invention;

Fig. 26 is a top plan view of a thermostatic element, used in the Fig. 25 embodiment;

Fig. 27 is a cross section taken substantially along line 27—27 of Fig. 26;

Fig. 28 is a cross section similar to Fig. 16, illustrating a fifth switch embodiment of the present invention;

Fig. 29 is a cross section similar to Fig. 28, showing the switch thereof in an alternative position;

Fig. 30 is an axial cross section of a sixth, valve embodiment of the present invention;

Fig. 31 is an axial section similar to Fig. 15 illustrating a seventh, non-thermostatic switch embodiment of the invention; and Fig. 32 is a cross section similar to Fig. 17 illustrating an eighth, flasher switch embodiment of the invention.

Similar reference characters indicate corresponding parts throughout the several views of the drawings.

While the present invention comprehends control devices of all sorts, its principal embodiment comprises an electric switch actuatable thermally and particularly adapted for motor protection usages. Other embodiments will also be described hereinafter. Electric switches of the type mentioned are used to make and break electrical circuits on the exceeding of certain safe electrical current values in the motor power circuit. Switches of this type are sometimes called "Thermal cutouts" and more particularly when applied to electric motors, "motor overload protective devices." While the switch embodiments of the present invention are applicable to other electrical devices than motors, the invention will be explained and illustrated in an embodiment as applied to motors.

A basic principle of the operation of many of the switch embodiments of the present invention is illustrated in the exceedingly simple embodiment shown in Figures 1 through 5, inclusive, to which attention is first directed. Referring to these figures, numeral 1 indicates a base for the switch, which is made of an electrical insulating material, such as Bakelite, porcelain, or the like. Mounted as by a rivet-type construction on the base 1 is a post 2 (see also Fig. 2), the top surface of which is flat except for a tapped hole 3. Fitting in the tapped hole 3 is a machine screw 4, which has, just beneath its head, an unthreaded portion 5 of somewhat greater diameter than the threaded shank of the screw. The screw 4 provides means for mounting a thermostatic metal blade or strip 6, one end of which has a hole 6a through which the portion 5 passes in a rotatable joint. The portion 5 is of sufficient axial length (preferably just slightly greater than the thickness of the thermostatic metal blade 6), so that when the screw 4 is threaded down tightly into the post 2, it does not bind the thermostatic blade 6 against pivoting movement, in its own plane, on the post 2.

The thermostatic blade 6 may be made of any suitable thermostatic material, such as the customary bimetal.

Mounted on the under side of the opposite or free end of the thermostatic metal blade 6 is an electrical contact button 7, the active face of which is presented downwardly. Mounted in position on the base 1 to engage the contact button 7 is a relatively stationary, cooperating contact button 8.

Numeral 9 indicates a post mounted on the base 1, which post 9 receives one end of a tension or coil spring 10. The other end of the coil spring 10 is hooked through a small hole 11 or otherwise attached to the edge of the thermostatic metal blade 6.

Figure 1:
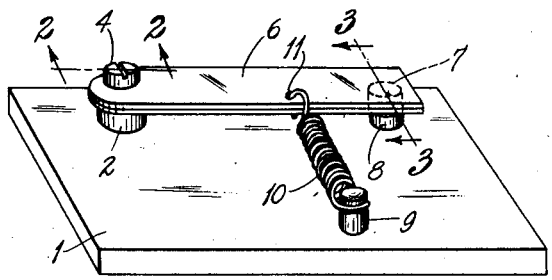
Figure 2:
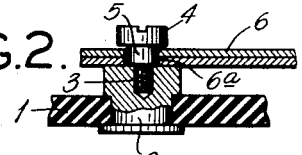
Figure 3:
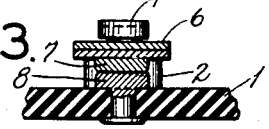
Figure 4:
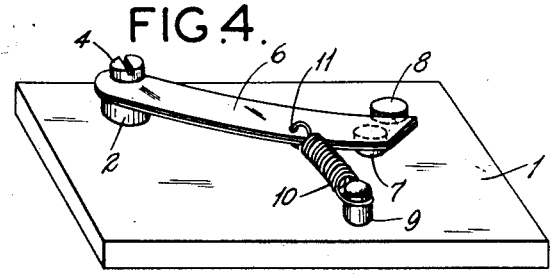
Fig. 4 is an isometric view similar to Fig. 1, illustrating another operating position of the Fig. 1 switch.

The various mountings are so arranged that, when the ambient temperature is at its proper value, the thermostatic blade 6 holds the contacts 7 and 8 firmly juxtaposed, in the manner indicated in Fig. 1. Under such conditions, the spring 10 is in tension, tending to rotate the blade 6 on the post 2 in such a manner as to disengage, by a rotative movement, the contacts 7 and 8. However, the frictional pressure between the contacts 7 and 8, engendered by the temperature-determined force in the bimetallic blade 6, is, at the desired normal ambient temperature, sufficient to overcome the tension of the spring 10, and the switch as a whole is therefore stable in its position represented by Fig. 1 when the ambient temperature is at a given level.

The thermostatic blade 6 is so mounted that upon change of temperature in a desired direction away from the established predetermined temperature, it tends to curl upwardly at its end carrying the contact 7. For example, if it is desired to break connections on rise of ambient temperature, the thermostatic metal blade 6 is so arranged that its free end curls upwardly on rise of temperature. In the alternative, if it is desired to break electrical connections on decrease of temperature below a predetermined level, the thermostatic metal blade 6 is so disposed that it tends to curl upwardly on decrease of temperature.

It will be appreciated that the only forces tending to hold the blade 6 in its Fig. 1 position are the deterring forces between the faces of contacts 7 and 8. As soon, however, as this deterring force is reduced below the force of the tension of the spring 10, as occasioned by the thermostatic blade 6 commencing to curl upwardly under change of ambient temperature, the tension of the spring 10 is relieved by rotating the blade 6 on the post 2, to the position shown in Fig. 4. It will be seen that this movement is in the nature of a rotation of the thermostatic blade in its own plane. Electrical connections between the contacts 7 and 8 are thereby broken, and it will be noted that the break takes place, not merely through the relatively short distance represented by the thermostatic movement of the blade 6 but through a much greater distance represented by the rotative or angular displacement of contact 7 from contact 8.

When, now, the ambient temperature reverses its trend, and returns to the predetermined normal value, the thermostatic blade 6 will tend to flatten, but unless external auxiliary actuation is employed, it will not in so flattening bring the contacts 7 and 8 back into juxtaposition, because of their angular displacement from each other through the action of the spring 10. The switch then assumes the position shown in Fig. 5, for example.

It will be understood, of course, that in practical switch constructions suitable provisions are made for making electrical connections to the contacts 7 and 8. In the interest of simplicity, such connections have been omitted from the showing of the present embodiment.

From the above, it will be seen that, with a minimum number of simple elements, a highly effective thermostatic electric switch has been provided, which switch operates automatically to open or interrupt its circuit in response to certain abnormal temperature conditions, but which will not automatically reestablish the circuit upon correction of the abnormal temperature conditions. In order to close the switch, the blade 6 must be manually or otherwise non-automatically rotated from its Fig. 5 position back to its Fig. 1 position, and it will then retain the Fig. 1 position only in the event that normal ambient temperature conditions have been reestablished, so that sufficient friction is brought about between the contacts 7 and 8 to oppose the tension of spring 10.

It is to be noted that the switch described is capable of manual opening at any time, prior to automatic opening thereof. All that needs to be done in order to manually open the switch is to lift the contact 7 from the contact 8, to reduce the pressure therebetween, and thereupon the spring 10 pulls the blade 6 to its Fig. 5 position.

An exceedingly simple switch capable of automatic or manual opening, but capable only of manual reclosing, is thereby provided.

Figure 6:
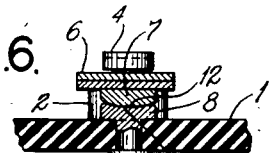
Figures 6 and 7 are cross sections similar to Fig. 3, illustrating alternative contact constructions.
Figure 7:
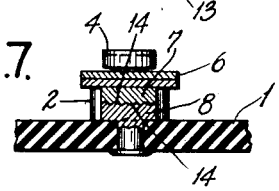
Figure 5:
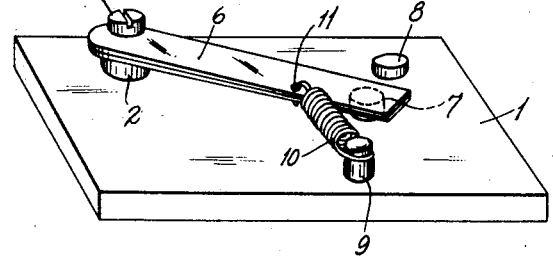
Fig. 5 is another isometric view similar to Fig. 1, illustrating a third operating position of the Fig. 1 switch.

Figures 6 and 7 illustrate alternative embodiments for the structure of the cooperating face of contacts 7 and 8, the purpose being to increase the interfacial friction. In Fig. 6, for example, the contact 7 has a convex operating face 12, while the contact 8 has a concave operating face 13, into which the convex face 12 of the contact 7 fits. It is evident that, with a given amount of thermostatic pressure holding the contacts 7 and 8 together, a substantial force will be required to wipe the contact 7 away from the contact 8. Similarly, in Fig. 7, the contacts 7 and 8 are provided with cooperating roughened or serrated faces 14, for the same purpose.

Figure 8:
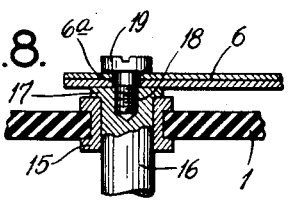
Fig. 8 is a cross section similar to Fig. 2, illustrating an alternative form of mounting.

Fig. 8 shows an alternative form of mounting for the pivoted end of the thermostatic metal blade 6. In the base 1 is riveted or otherwise affixed a collar or bushing member 15. Rotatably fitted in the bushing 15 is a post 16, the upper end of which is suitably headed as indicated in numeral 17, and provided with a tapped hole 18. Numeral 19 indicates a machine screw that passes through the hole 6a in thermostatic metal blade 6, and engages the threaded hole 18 in the post 16. In this embodiment, the head of machine screw 19 tightly clamps the thermostatic metal blade 6 to the head 17 of post 16, so that the pivoting of the blade 6 now takes place by rotating the post 16 in the collar or bushing 15. The post 16, it will now be seen, rotates coextensively with the operative rotations of the thermostatic metal blade 6, and this rotative movement may be used to control whatever type of device it is desired to operate. For example, if an electric switch is desired, the rotatable post 16 may mount and control the action of a mercury switch or some similar switching means. Or, if it is desired to control a valve, such as a stop cock valve, the post 16 may be connected to directly rotate the cock of the valve.

Figure 9:
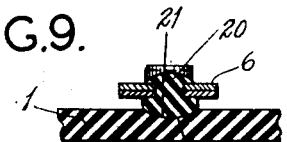
Fig. 9 is a cross section similar to Figures 3, 6 and 7, illustrating an alternative construction for the operating end of the thermostatic switch.

When the construction of Fig. 8 is used, and the control is effected by the rotatable post 16, it is no longer necessary (although it may be desirable) that electrical contacts 7 and 8 be provided as in the previous embodiments. Alternatively, a construction such as illustrated in Fig. 9 may be provided. Here it will be seen that the end of the blade 6 is provided with, for example, an insulating material rivet 20 having a convex face 21 engaging a suitable concave depression 22 formed directly in the base 1. In such an embodiment, the deterring force opposing the rotative tendency of the thermostatic metal blade 6 under the tension of the spring 10 is brought about by the engagement of convex face 21 of the rivet 20 with the concave depression 22 in the base 1. The action, however, is largely the same as in the previously described embodiment.

Figure 10:
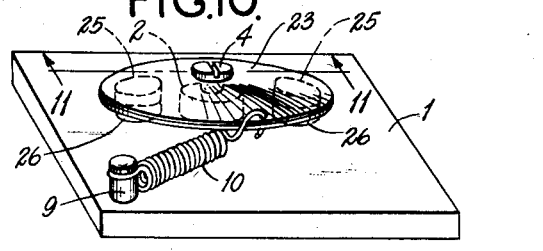
Fig. 10 is an isometric view of a second form of switch embodying the present invention.
Figure 11:
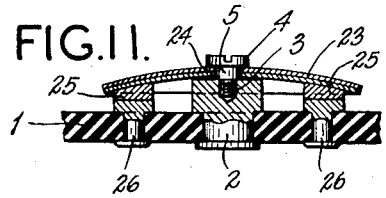
Fig. 11 is a vertical cross section taken substantially along line 11—11 of Fig. 10.

Figures 10, 11, 12 and 13 illustrate a slightly more complicated embodiment of the present invention. In this embodiment, the relatively slow-acting strip or blade 6 has been replaced by a snap-acting thermostatic disc 23, of the type shown in John A. Spencer Patent 1,448,240, for example. As shown in Fig. 11, the disc 23 is mounted on the post 2 by the screw 4 in a manner similar to the Fig. 2 embodiment, the disc 23 being provided with a central hole 24 for receiving the collar portion 5 of the screw 4. The mounting thus afforded is sufficiently loose that the disc can undergo the desired rotative movement without binding.

To the under, normally concave surface of disc 23 are affixed, at diametrically opposite points, a pair of relatively movable electric contact buttons 25. In cooperating position on the base 1 are mounted a pair of cooperating stationary contact buttons 26.

In this embodiment the tension spring 10 is so positioned that, when the contacts 25 and 26 are respectively juxtaposed, it pulls with a tangential component on the edge of disc 23, tending to cause said disc to rotate or pivot on the post 2.

Following the principles heretofore enunciated, the thermostatic disc 23, when at a predetermined normal temperature, holds the respective contacts 25 and 26 juxtaposed with sufficient pressure so that their interfacial friction is great enough to oppose the tendency of the tension spring to rotate the disc 23 on post 2. However, as soon as the ambient temperature changes through a sufficient extent, the disc 23, due to its inherent characteristics, will snap to a position of opposite concavity, as illustrated in Fig. 12, and in so doing it releases the pressure between respective contacts 25 and 26 and eliminates the interfacial friction therebetween, so that the spring 10 at once rotates the disc 23 on the post 2 until said spring 10 has assumed a straight line position connecting posts 9 and 2. In this manner, both the contacts 25 are not only lifted away from stationary contacts 26, but are also angularly displaced or wiped away therefrom. On subsequent change of ambient temperature in the reverse direction, the disc 23 snaps back to its original direction of concavity, but it does so at its new angular position on the post 2, and the contacts 25 and 26 are therefore not re-juxtaposed. Under such conditions, the switch assumes the position shown in Fig. 13. To reestablish circuit connections from the Fig. 13 position, the disc 23 must be manually rotated back to its Fig. 10 position.

It will accordingly be seen that the embodiment of Figures 10 through 13 operates in accordance with the same principles as the embodiment of Fig. 1. It should be understood, of course, that the variations represented by Figures 6, 7, 8 and 9 may likewise be utilized in the embodiment of Fig. 10.

Furthermore, it is to be noted that it is not necessary that the concave thermostatic disc 23 be of a snap-acting type. On the contrary, a concave thermostatic disc that moves slowly, or creeps, between its positions of opposite concavity may be used with success, as the rapidity with and distance through which spring 10 angularly displaces disc 23 once the interfacial contact pressure decreases below a given amount, is sufficient to eliminate any arcing problem on separation of the contacts.

Figures 14 through 20 show a practical switch embodiment of the invention following the general principles of the embodiment of Fig. 10. The embodiment of Figures 14 through 20 have been particularly designed for use as a "thermal cutout," or "motor overload protective device." This switch has the very practical feature that it automatically breaks circuit connections when the current value exceeds a predetermined limit, or when the ambient temperature exceeds a predetermined limit. This switch will not re-set itself automatically; that is to say, once circuit connections have been broken, manual actuation is needed in order to reestablish such circuit connections. This is a valuable protective feature in connection with motor overload protection. The switch is so constructed, however, that it may be manually disconnected or connected at any time; and it is accordingly useful as a starting and stopping switch for the motor.

Referring to Figures 14 through 20, numeral 30 indicates a base for the switch of cup-like construction, comprising a bottom portion 31 and an upstanding, generally cylindrical wall 32. Projecting out of the top of the cupshaped base 30 is a generally cylindrical control knob 33, the particular construction of which will be given in greater detail hereinafter. Both the base 30 and the knob 33 are preferably made of an electrical insulating material, such as molded Bakelite, porcelain, etc. Base 30 is preferably provided with external mounting ears 29.

Mounted centrally in the bottom 31 of the base 30 is a threaded post 34, which has a polygonal head 35 for adjusting purposes. A lock nut 36 secures the relative adjustment of the post 34 in the bottom 31. On the other side of the bottom 31, the post 34 is extended into knob 33 as an unthreaded cylindrical portion 37 of reduced diameter.

Extending through the bottom 31 of the base 30 are three electrical terminal pieces 38, 39 and 40, the angular disposition of which about the post 34 is indicated in Fig. 18. Terminal pieces 38 and 39, it will be seen, are diametrically opposite each other. The angular position of terminal piece 40 is relatively immaterial.

The terminal pieces 38, 39 and 40 comprise sheet metal stampings which are force-fitted into the bottom 31 of base 30, affording internal contact faces 41, 42 and 43, respectively, and external loops 44, 45 and 46, respectively, to which external connections may be made as by soldering. The particular construction of the terminal pieces 38, 39 and 40 is immaterial to the present invention, and hence need not be described at length herein.

Internally of the cup-shaped base 30, the surface of bottom 31 is provided with a substantially annular groove 47, which extends approximately concentrically about the post 34 from terminal piece 39 to terminal piece 40. In the groove 47 is positioned a coiled electrical resistance heater wire 48. One end of the heater wire 48 is electrically connected to terminal piece 39, while the other end is electrically connected to terminal piece 40.

The internal wall of the cylindrical portion 32 of the base 30 is provided with diametrically opposite bayonet-type notches 49, extending through, say, about 60° of arc. The notches 49 have, at one diametrically opposite end of each, relatively deeper portions 50, extending through about, say, 25° of arc, and bottoming on the inner surface of the bottom 31. The notches 49 also have relatively shallower diametrically opposite portions 51, which terminate downwardly as flat ledges or platforms 52.

Mounted on the reduced diameter portion 37 of post 34, on the shoulder afforded by the termination of the threaded portion of said post 34, is a peripherally grooved collar 53, into the groove of which relatively loosely fits the internal periphery of a perforated thermostatic metal disc 54 of the same general type as the disc 23 of the Fig. 10 embodiment. The disc 54 is held in position in the groove 53 by a polygonal, preferably hexagonal collar or nut 55, which clamps down on the collar 53. The collar 55 is force-fitted to the reduced diameter portion 37 of post 34, so that it cannot rotate relative thereto. On the surface of disc 54 facing the bottom 31 are mounted, as by welding, in diametrically opposite positions, a pair of contact buttons 56 and 57, which are positioned at suitable radial distances to engage contact plates 41 and 42 when the disc 54 is concave to the right, as illustrated in Figures 15 and 17.

Referring now more particularly to Figures 15 and 17, it will be seen that the disc 54 is provided, at diametrically spaced points on its periphery, with a pair of upstanding ears 58.

On each side of each ear 58 is a projection 59 extending outwardly from the periphery of the disc 54, but relieved slightly from said disc for a portion of its length remote from the ear 58 in order to be bent upwardly to form a sloping surface of an inclined-plane, camming character. The slope is opposite in direction for each projection of the pair on either side of each ear 58.

The disc 54, it will be understood, rotates freely in the groove of collar 53, relative to the post 34.

Numeral 60 indicates a coil spring, of general type of a watch spring, the inner end 61 of which is polygonally formed in order to embrace the periphery of polygonal collar 55. The outer end 62 of spring 60 is turned into substantially the plane of disc 54, and at its extremity is hooked into a hole 63 in the disc 54 provided for that purpose. Coil spring 60 is normally in tension, and, reacting centrally on the polygonal collar 55 (which, it will be recalled, is relatively nonrotatable with respect to the post 37), it tends at all times to rotate the disc 54, relative to the post 37, in a counterclockwise manner, considered from the viewpoint represented by Fig. 17. Adjustment of the amount of tension in the spring 60 may be made by slipping its polygonal inner end 61 around the polygonal collar 55. In order to do this, the inner end 61 is momentarily pried away from the surface of collar 55. In normal operation, however, the polygonal portion 61 of the spring 60 effectively anchors it to the collar 55 in a relatively non-movable manner.

Surmounting the polygonal collar 55 on the reduced diameter portion 37 of post 34 is a relatively long sleeve 64, the outer end of which is outwardly flanged as indicated at numeral 65. Preferably the sleeve 64 is a forced-fit on the post portion 37, so that it does not rotate relative thereto. Beyond the flange 65, reduced diameter portion 37 is preferably upset and headed over, as indicated at numeral 66.

The inner face of knob 33 is provided with a circular depression 67 of sufficient depth substantially to enclose the coil spring 60. Extending inwardly from the center of the depression 67 is a cylindrical hole 68, into the emergent end of which is force-fitted a collar or bushing 69 that turns freely on the sleeve 64 on post portion 37. The knob 33 as a whole is thus rotatable relative to the shaft 34, as is the thermostatic disc 54.

Extending outwardly from the outer periphery of knob 33, at the inner end thereof, are diametrically opposite projections 70. Each projection 70 includes, in its under surface and at its outer edge, a notch 71 of sufficient width freely to receive the upstanding projection 58 on the periphery of thermostatic disc 54. The notches 71 are of sufficient depth to accommodate said projections 58 regardless of the direction of concavity of the disc 54.

The projections 70 extend radially outwardly sufficiently far so that they fit only into the bayonet-type notches 49 in the base member 30. By abutting the ends of said bayonet notches 49, the said projections 70 limit the rotative movement of the knob 33 in the base 30.

As shown in Fig. 14, the outer face or end of the knob 33 is preferably provided with a position-indicating means, such as the arrow 33a.

Despite its more complex form, the embodiment of Figures 14 through 20 operates in substantially the same manner as the Fig. 10 embodiment. That is ot say, when the thermostatic disc 54 is below a certain temperature, it is concave to the right, in Fig. 15, and it provides pressure between the contacts 56 and 41, and 57 and 42, respectively, sufficiently great that the interfacial friction therebetween prevents the disc 54 from rotating under the influence of coil spring 60. When, however, the temperature of the disc 54 increases sufficiently in amount, said disc snaps or moves to a position of opposite concavity, i. e., concave to the left in Fig. 15, and in so doing it lifts the contacts 56 and 57 from the contacts 41 and 42. There is then no frictional deterrent to the rotative influence of the spring 60, and consequently the thermostatic disc 54 rotates on the post 37 in a counterclockwise manner, to the position shown in Fig. 19. When the disc 54 rotates, it carries with it the knob 33, by engagement of the upstanding projections 58 with the notches 71. The projections 59 do not interfere with this rotative movement, because when the disc 54 is concave to the left in Fig. 15, said projections 59 are raised above the level of the ledges 52 bottoming the notch portions 51 in base 30.

Assuming now that the disc 54 cools while in its Fig. 19 position, it will snap back to its original position of concavity, i. e., concave to the right in Fig. 15. However, under normal conditions there is no automatic tendency for the disc to rotate back to its Fig. 17 position, so it does not do so, but remains in its Fig. 19 angular position. The projections 59 thus come to rest upon the ledges 52, as shown in Fig. 20. The movable contacts 56 and 57 are now held out of engagement with the fixed contacts 41 and 42 both by reason of the angular displacement of disc 54 and base 30, and by reason of the fact that the engagement of projections 59 with ledges 52 mechanically prevents the disc 54 from overcentering all of the way to its position of right-hand concavity.

After the disc 54 has thus assumed the Fig. 20 position, it is necessary manually to rotate the knob 33 in a clockwise manner to reestablish circuit connections. By such rotation, the disc 54 is rotated in a clockwise manner through the engagement of projections 58 with notches 71, and as the projections 59 pass off the ledges 52, said projections sink into the deeper notch portions 50, and bring the relatively movable contacts 56 and 57 back into juxtaposition with the relatively fixed contacts 41 and 42.

The positioning of the projections 59 in the deeper notch portions 50 provides an additional securing means against counterclockwise rotation of the disc 54 under the influence of the coil spring 60, unless said disc 54 is snapped over to its position of leftward concavity.

It will thus be seen that the switch as described is fully capable of automatic circuit-breaking operations, but capable only of manual circuit-making operation once it has been opened.

The construction is such, however, that the switch may be manually opened at any time. This is because the sloping character of the projections 59 makes it possible manually to rotate the knob 33, and with it the disc 54, in a counterclockwise manner from the Fig. 17 to the Fig. 19 position. The sloping faces of these projections 59, ride up on the ledges 52 under such manual actuation of the knob 33. It is thus seen that the switch is capable of manual disconnecting operation as well as automatic disconnecting operation. It may accordingly be used as a simple on and off switch for an electric motor, for example, with the additional feature of automatic overload protection in its automatic disconnecting capabilities.

By adjusting the threaded portion of post 34 in base 30 an adjustment of the operating, or snapping temperature of disc 54 is brought about. The reasons for such action are described at length elsewhere, and need not be repeated herein. Lock nut 36 secures such adjustment once it is made.

Figures 21 through 24 represent exemplary circuits in which the switch of the present invention, such as the Fig. 14 embodiment, may be connected for motor protection service.

The switch is connected by means of contact terminals 38 and 40 in series with the motor, such as motor 72 in Fig. 21, or other device it is desired to protect, in series with the source of power, represented in Fig. 21 by power lines 73 and 74. Assuming that knob 33 has been rotated until contacts 56 and 41, and 57 and 42 respectively make contact, as in Figures 15 and 17, current will flow from one of the power wires 73 to terminal 38, to contact 41, to contact 56, through disc 54 to contact 57, to contact 42, through heater wire 48, to contact 43, to terminal 40, to the motor 72 and thence to the other power wire 74. Thus, while the motor is running under its normal conditions, heater wire 48 is subject to electrical current passing through it and because of the heating effect of the current passing through it will be raised in temperature an amount determined by the characteristics of the heater and the amount of current. The current is also passing through disc 54 and because of this current passage and the inherent electrical resistance of disc 54, disc 54 will undergo some temperature rise itself. However, under the normal, safe current values encountered in the circuit, the resulting temperatures are not sufficient to cause disc 54 to snap and thus to break the circuit. However, if excess currents should arise in the circuit, heater 48 will become hot enough (considering the action of the increased current in disc 54 upon said disc itself) to raise the temperature of disc 54 to cause it to snap into its position of opposite convexity. This breaks the circuit at contacts 41 and 56, and also at contacts 42 and 57. When the contacts 56 and 57 are lifted away from contacts 41 and 42 by the action of the disc 54, the disc 54 is free to rotate on the post portion 37. Spring 60 then pulls disc 54 around, and when disc 54 cools and snaps back it does so in position to drop contacts 56 and 57 down angularly displaced from contacts 41 and 42 (Fig. 19). To reset and thus reconnect the circuit, all that is now necessary is to rotate knob 33 in the opposite direction back to its Fig. 16 position, thus causing contacts 56 and 57 to come back into juxtaposition with contacts 41 and 42 in the manner heretofore described. In this Fig. 16 position the contact pressure between contacts 41 and 56, and between contacts 42 and 57, is sufficient to hold the disc 54 from rotating under the influence of spring 60. This position is now maintained until the circuit is ready to break again at which time pressure is relieved because of the upward action of the disc 54 away from contacts 41 and 42, and thus the knob 33 and disc 54 rotate again.

Figures 22, 23 and 24 show other motor protective circuits utilizing the switch embodiment just described. For example, in Figures 22 and 23 the motor 72 is shown as one having two windings 75 and 76, it thus being of the type referred to as a dual voltage motor. The windings 75 and 76 may be connected in series (Fig. 23) for high voltage operation, or in parallel (Fig. 22) for relatively lower voltage operation. In essence, the elements of the Fig. 23 circuit are the same as those of the Fig. 21 circuit, the difference being in this instance that the two windings are both protected. The operation of the Fig. 23 circuit is the same as that of the Fig. 21 circuit, and hence no added description thereof is needed at this point.

In Fig. 22, however, the connections are somewhat different. One lead of each winding 75 and 76 is connected to power line 74. The other lead of winding 75 is connected to terminal 39, while the other lead of winding 76 is connected to terminal 40. Terminal 38 is connected to the second power line 73. Thus the heater 48 is in series with only winding 76, while the disc 54 is in series with both windings 75 and 76. This disc 54, because of its electrical resistivity, is thus its own heater for current passing through either winding 75 or 76, and consequently thus protects both windings. Winding 76 is additionally protected, however, by the heat accelerating effect of heater 48 on disc 54. Thus winding 76 is afforded extra protection.

Fig. 24 shows the use of the switch described in a circuit similar to that of Fig. 21 for the protection of a motor of the type having separate starting and running windings 77 and 78 respectively. Starting winding 77 is connected in series with heater 48 and disc 54, like winding 76 of the Fig. 22 circuit, while running winding 78, like winding 75 of Fig. 22, is connected in series with only the disc 54. Starting winding 76 is thus afforded additional protection.

Many further variations of structure are possible without departing from the scope of the invention. One of such variations, particularly with respect to the type of thermostatic element utilized, is illustrated in Figures 25, 26, and 27, to which attention is now directed. Referring to these figures, it will be seen that the thermostatic disc 54 of the Fig. 14 embodiment has been replaced by a rectangular shaped thermostatic plate 79, which is shown as having arcuate ends, although such shape is not important. The plate 79, made of composite thermostatic material such as bimetal, conforms generally to the disclosure of John A. Spencer Patent 1,639,708, dated August 23, 1927, in that it is provided in its central portion with a dent or dished region 80 (exaggerated in extent in Fig. 27 for clarity). The customary contact buttons 56 and 57 are carried by the plate 79 outside the confines of this dented region 80, and a hole 63 is provided for receiving the end of coil spring 60. The ears 58 and projections 59 are provided as in the Fig. 14 embodiment. Because of the mechanical structure of dented region 80, the plate 79 as a whole is snap-acting in response to its ambient temperature changes, the snap movement taking place in each direction between the full and dotted line positions in Fig. 27.

The Fig. 25 embodiment as a whole operates in the same manner as the Fig. 14 embodiment.

It will clearly be seen thermally responsive elements of any shape (such as diamond-shaped, elliptical, square, or the like) may similarly be used without departing from the scope of the invention.

Figures 28 and 29 illustrate an embodiment of the invention that operates somewhat differently than the previous embodiments. In this Fig. 28 embodiment it is impossible manually to turn off the switch once it is turned on (such turning off being solely automatic), while it is impossible automatically to turn on the switch once it has been turned off (such turning on being accomplished solely manually). In prior embodiments the switch can be turned on or off, manually, at any time. Switches of the present type are of use in connection with certain types of circuit controls.

Referring to Figures 28 and 29, it will be seen that the peripherally relatively short notches 71 in the projections 70 on knob 33 are replaced by notches 81 that extend a relatively much longer peripheral distance around the under face of knob 33. In fact, the angular extent of the notches 81 is preferably only slightly less than the angular extent of the bayonet-like notches 49 in space 30. By this simple expedient the desired action of the switch is brought about. It will clearly be seen that, with the Fig. 28 embodiment, and the switch in circuit making position, if the knob 33 is rotated in a counterclockwise manner (the same movement that in the Fig. 14 embodiment manually disconnected the switch), the disc 54 will not change in angular position, because the projections 58 will slide freely in the elongated notches 81 until the projections 70 on knob 33 abut the ends of bayonet-like notches 49.

However, when said switch has assumed its automatically disconnected position, and the disc is rotated to the full extent in a counterclockwise position, as illustrated in Fig. 29, it may be manually brought back to connecting position in the manner heretofore described, because in this event the projections 58 are engaged by operative ends of the notches 81.

The embodiment of Fig. 28, therefore, is capable solely of automatic disconnecting operation, and capable solely of manual connecting operation.

Fig. 30 illustrates an embodiment of the invention wherein a valve 82, rather than an electric switch, is the principal controlled element (although Fig. 30 likewise includes the switch elements of Fig. 14, etc.). The differences between this Fig. 30 embodiment and the first embodiment will now be described.

Valve 82 has a tubular body 83 providing a cylindrical passage 84 terminating as conduit-receiving sockets 85. Extending across and blocking the passage 84 is a tapered plug or cock 86 having an opening 87 therethrough which permits or prevents flow through the valve depending upon the rotative position of plug 86. Plug 86 is held firmly seated by a compression spring 88 reacting at one end against the wider end of plug 86, and at the other end against the inside of a plug 89 threaded in a lateral extension 90 of valve body 83.

The opposite or narrower end of plug 86 extends into a lateral extension 91 on the opposite side of valve body 83, and terminates as a polygonal (such as a square) socket 92. Extension 91 terminates as a flange 93 which is secured as by screws 94 to the under side of base 30.

The construction of the control portion of this embodiment is quite similar to that of the Fig. 14 embodiment, except for the construction associated with the central mounting post or screw 34 of the Fig. 14 embodiment. The latter is replaced, in Fig. 30, by an unthreaded shaft 95 rotatably received in a bushing 96 threaded into base 30. Collars 97 and 98 fixed on shaft 95 prevent its relative axial movement with respect to bushing 96. A lock nut 99 secures bushing 96 in its adjusted position. The lower end 100 of shaft 95 is made polygonal in cross section to fit slidably in polygonal socket 92 extending from valve plug 86.

The bushing 96 has an unthreaded portion 101 of reduced diameter at its upper or inner end, on which are mounted grooved disc-mounting collar 53 and hexagonal collar 55. As in the Fig. 14 embodiment, the hexagonal collar 55 is a forced-fit on portion 101, so that it is non-rotatable relative thereto.

Knob 33 is, in this embodiment, mounted directly on shaft 95, and is made non-rotatable relative thereto as by a set screw 102.

This Fig. 30 embodiment constitutes in effect a motorized, or relay-operated valve, and operates in the following manner: Through the terminals 38 and 40 an outside source of power is provided for the heater 48. By also using terminal 39 as in the Fig. 14 embodiment, the device additionally functions as a switch to interrupt its own source of power.

Shaft 95, it will be seen, now operates to rotate in bushing 96 coextensively with the rotations of disc 54 and knob 33, by reason of the projections 58, notches 71, and set-screw 102. And, through the engagement of polygonal extension 100 with polygonal socket 92, the rotation of shaft 95 causes coextensive rotation of plug 86 to alter the condition of the valve 82 (from open to shut or vice versa). If, for example, valve 82 is open when knob 33 is in a position corresponding to Fig. 17, then, when heater 48 is sufficiently energized, valve 82 will automatically close and will remain closed until knob 33 is manually returned to its Fig. 17 position. Reversed operation of valve 82 can likewise be obtained.

In the Fig. 30 embodiment the operating temperature of disc 21 is adjusted by adjusting bushing 96 in base 4. The socket type connection (parts 92 and 100) to the valve plug permit the axial movement of shaft 95 necessary for such adjustment.

It will be seen that the other embodiments heretofore described (such as those of Figures 25 and 28) may similarly be applied to a valve structure for operation thereof in the general manner of Fig. 30.

If a simple, non-thermally-responsive manually operative electrical switch is desired, the Fig. 14 structure may be modified to that shown in Fig. 31. Referring to this figure, it will be seen that the bimetallic snap-acting thermostatic disc 54 of the Fig. 14 embodiment described has been replaced by a concave, monometallic spring disc 103, mounted in the same manner with respect to base 30 and post 34, and carrying movable contacts 56 and 57 as heretofore.

This embodiment has been modified with respect to the Fig. 14 embodiment by the elimination of the following elements, which are no longer necessary: heating element 48 and its groove 47, terminal piece 40 and spring 60. Collar 55, no longer necessarily polygonal in shape, has been reduced in size, and the circular indentation 67 in knob 33 has been eliminated.

The switch is otherwise the same as in the first embodiment described.

This switch operates as a simple electrical make-and-break switch by manually rotating the knob 33 with its projections 70 consequently moving to and fro in bayonet-type slots 49. In one position movable contacts 56 and 57 rest on fixed contacts 41 and 42 to complete (or make) connections between terminals 38 and 39. In the other position movable contacts 56 and 57 are angularly displaced from fixed contacts 41 and 42 to disconnect (or break) connections between terminals 38 and 39. The spring disc 103 never snaps to opposite curvature, but its inherent resiliency makes for firm contact pressure when the switch is closed, and positive separation when the switch is open. Because disc 103 never snaps to opposite curvature, spring 60 is unnecessary and has been omitted.

Fig. 32 shows how, by a simple expedient, the Fig. 14 switch may be converted into a manually controllable flasher switch, for example. The only change as between Figures 17 and 32 is that the coil spring 60 has been inverted so that it now tends to move the disc 54 clockwise instead of counterclockwise. In other words, spring 60 now disposes the disc to contact-making position.

With such a structure, the disc 54, upon heating above its predetermined value, snaps to a position of opposite concavity, thereby breaking connections, but without any angular re-positioning of the disc. When the disc 54 then cools, it returns to its initial direction of concavity and thereby re-establishes circuit connections. In the respect that the switch thus automatically closes as well as opens, it differs from previous embodiments.

The knob 33 is now manipulated merely to turn the switch on and off independently of its thermostatic activity, the Fig. 32 embodiment in this respect being similar to the Fig. 31 embodiment.

A switch of this Fig. 32 type is useful, for example, in an automobile as a direction signal controller switch. The knob 33 is then used to turn the switch on and off. When manually on, if the heating value of the heater 48 is properly proportioned, the switch will repeatedly, automatically turn on and off, thus providing for the flashing type of signal currently in favor.

The spring 60 is not absolutely necessary to the Fig. 32 embodiment, but it tends to maintain more certainly the proper angular disposition of the disc, so that when the disc automatically closes, it will clearly and directly bring movable contacts 56 and 57 into proper juxtaposition with fixed contacts 41 and 42.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

Attention is directed to my copending applications Serial No. 471,140, filed January 2, 1943, and Serial No. 471,141, filed January 2, 1943.

I claim:

1. A thermostatic control comprising an element the position of which changes automatically in one plane of movement in response to temperature changes, means pivotally mounting said element to rotate in another plane of movement, means disposing said element to move in one direction in said second plane of movement, a relatively fixed contact, and a relatively movable contact carried by said element and engaging said fixed contact, when said element is in one of its temperature-determined positions, with sufficient pressure to resist said disposing means.

2. A thermostatic control comprising a thermostatic material plate, means pivotally mounting said plate to rotate substantially in its own plane, means disposing said plate to rotate in one direction on said mounting, and means carried by said plate and engaging further means to resist the rotating means as long as said plate is in one of its temperature-determined positions.

3. A thermostatic control comprising a thermostatic material plate, means pivotally mounting said plate to rotate substantially in its own plane, spring means disposing said plate to rotate in one direction on said mounting, and means carried by said plate and frictionally engaging further means to resist the spring means as long as said plate is in one of its temperature-determined positions.

4. A thermostatic control comprising a thermostatic material plate, means pivotally mounting said plate, means disposing said plate to rotate in one direction on said mounting, and means carried by said plate and frictionally engaging further means to resist the rotating means as long as said plate is in one of its temperature-determined positions, said last-named means being ineffective to resist said rotating means when said plate moves to another temperature-determined position.

5. A thermostatic control comprising a thermostatic material plate, means pivotally mounting said plate, means disposing said plate to rotate in one direction on said mounting, a relatively fixed contact, and a relatively movable contact carried by said plate and engaging said fixed contact, when said plate is in one of its temperature-determined positions, with sufficient pressure to resist said rotating means.

6. A control as set forth in claim 5 in which the two contacts are provided with non-planar faces tending to increase the interfacial friction therebetween.

7. A control device comprising a base, a resilient plate mounted on said base and rotatable with respect thereto, at least one projecting member carried by said plate and forced by the resilience thereof into frictional engagement with said base, means for rotating said plate relative to said base, and control-effecting elements determined as to condition by the relative rotative positioning of said plate on said base.

8. A control device comprising a base, a resilient plate mounted substantially parallel to said base and rotatable with respect thereto between two limiting angular positions on an axis perpendicular to the base, at least one projecting member carried by said plate and forced by the resilience thereof into frictional engagement with said base, means for manually rotating said plate relative to said base, means limiting the movement of said last-named means to determine the said limiting positions, and control-effecting elements determined as to condition by the relative angular positioning of said plate on said base.

9. A control device comprising a base, a resilient thermostatic material plate mounted substantially parallel to said base and rotatable with respect thereto between two limiting angular positions on an axis perpendicular to the base, at least one projecting member carried by said plate and forced by the resilience thereof against said base, means for manually rotating said plate relative to said base, control-effecting elements determined as to condition by the relative angular positioning of said plate on said base, and means normally urging said plate to move to one of its limiting positions.

10. A control device as set forth in claim 9, in which the plate comprises a dished composite thermostatic material element which is adapted to snap between two positions of opposite concavity in response to ambient temperature changes, in one of which positions only does it force the projecting member carried thereby resiliently against said base.

11. A control device as set forth in claim 9, in which the plate comprises a dished composite thermostatic material element which is adapted to snap between two positions of opposite concavity in response to ambient temperature changes, in one of which positions only does it force the projecting member carried thereby resiliently against said base to resist said urging means, the composite thermostatic material plate, whenever it is in its other position of concavity, being free to rotate under the influence of said urging means.

12. A control device as set forth in claim 9 in which the control-effecting elements comprise electrical contact means adapted to make and break a circuit respectively in accordance with the relative angular positioning of said plate on said base.

13. A control device as set forth in claim 9 in which the control-effecting elements comprise the parts of a valve adapted to control flow therethrough in accordance with the relative angular positioning of said plate on said base.

14. An electric snap switch comprising a dished resilient member, a base, means mounting said member substantially parallel to said base, at least one movable contact on said member, and at least one cooperating fixed contact on said base, and means for rotating said member relative to said base to angularly displace said movable contact from said fixed contact.

15. A thermally responsive electric snap switch comprising a base, a snap-acting composite thermostatic material disc having two positions of opposite concavity, at least one movable contact on said disc, and at least one cooperating fixed contact on said base, and means for rotating said disc on its axis to angularly displace said movable contact from said fixed contact.

16. A thermostat comprising a base, a snap-acting composite thermostatic material disc having two positions of opposite concavity, means mounting said disc substantially parallel to said base, means securing said disc against rotation on its axis with respect to said base when said disc is in one of its positions of concavity, and means urging said disc to rotate on its axis when said disc is in its other position of concavity.

17. In a control device, a base member, a post mounted thereon, a spring member mounted on said post substantially parallel to said base and resiliently bearing thereagainst and rotatable with respect to said base in a plane substantially parallel to said base, said spring having at least one peripheral projection of cam shape, means extending upwardly from said base and engaging both sides of said projection to define one angular position of said spring, said last-named means extending circumferentially in one direction as a ledge on to which said projection rides against the normal tension of said spring to define a second angular position of the spring, and control means determined as to condition by the relative angular disposition of said spring and said base.

18. In a control device, a base member, a post mounted thereon, a spring member mounted on said post substantially parallel to said base and resiliently bearing thereagainst and rotatable with respect to said base in a plane substantially parallel to said base, said spring having at least one peripheral projection of cam shape, means extending upwardly from said base and engaging both sides of said projection to define one angular position of said spring, said last-named means extending circumferentially in one direction as a ledge on to which said projection rides against the normal tension of said spring to define a second angular position of the spring, and control means determined as to condition by the relative angular disposition of said spring and said base, manually operable handle means mounted on said post, and means interconnecting said handle means and said spring for coextensive rotary movement.

19. In a control device, a base member, a post mounted thereon, a spring member mounted on said post substantially parallel to said base and resiliently bearing thereagainst and rotatable with respect to said base in a plane substantially parallel to said base, said spring having at least one peripheral projection of cam shape, means extending upwardly from said base and engaging both sides of said projection to define one angular position of said spring, said last-named means extending circumferentially in one direction as a ledge on to which said projection rides against the normal tension of said spring to define a second angular position of the spring, and control means determined as to condition by the relative angular disposition of said spring and said base, manually operable handle means mounted on said post, and means interconnecting said handle means and said spring for coextensive rotary movement, said interconnecting means including an upstanding projection on said spring which extends into a suitable recess in said handle means.

20. In a control device, a base member, a post mounted thereon, a spring member mounted on said post substantially parallel to said base and resiliently bearing thereagainst and rotatable with respect to said base in a plane substantially parallel to said base, said spring having at least one peripheral projection of cam shape, means extending upwardly from said base and engaging both sides of said projection to define one angular position of said spring, said last-named means extending circumferentially in one direction as a ledge on to which said projection rides against the normal tension of said spring to define a second angular position of the spring, and control means determined as to condition by the relative angular disposition of said spring and said base, manually operable handle means mounted on said post, and means interconnecting said handle means and said spring for coextensive rotary movement, said interconnecting means including an upstanding projection on said spring which extends into a suitable recess in said handle means, said recess being extended in length whereby a lost-motion connection only is had between said handle means and said spring.

21. A control device as set forth in claim 17, in which the control means comprise electrical contacts, one of which is mounted on said base, and the other of which is mounted in cooperating position on said spring.

22. A control device as set forth in claim 17, in which the spring member comprises a dished resilient metal disc.

23. A control device as set forth in claim 17, in which the spring member comprises a dished composite thermostatic metal disc.

24. A control device as set forth in claim 17, in which the spring member comprises a dished composite thermostatic metal disc capable, under changing ambient temperatures, of snapping between positions of opposite concavity, in only one of which positions does it bear against said base.

25. A control device as set forth in claim 17, in which the spring member comprises a dished composite thermostatic metal disc capable, under changing ambient temperatures, of snapping between positions of opposite concavity, in only one of which positions does it bear against said base, and further spring means normally urging said disc to the aforesaid second angular position.

26. A control device as set forth in claim 17, in which the spring member comprises a dished composite thermostatic metal disc capable, under changing ambient temperatures, of snapping between positions of opposite concavity, in only one of which positions does it bear against said base, and further spring means normally urging said disc to the aforesaid second angular position, said further spring means being rendered ineffective, however, as long as said disc is in its position bearing against the base by the friction therebetween.

27. A control device as set forth in claim 17, in which the spring member comprises a dished composite thermostatic metal disc capable, under changing ambient temperatures, of snapping between positions of opposite concavity, in only one of which positions does it bear against said base, and further spring means normally urging said disc to the aforesaid first angular position.

28. A control device as set forth in claim 19, in which the spring member comprises a dished resilient metal disc.

29. A control device as set forth in claim 19, in which the spring member comprises a dished composite thermostatic metal disc.

30. A control device as set forth in claim 19, in which the spring member comprises a dished composite thermostatic metal disc capable, under changing ambient temperatures, of snapping between positions of opposite concavity, in only one of which positions does it bear against said base, and further spring means normally urging said disc to the aforesaid second angular position.

31. A control device as set forth in claim 19, in which the spring member comprises a dished composite thermostatic metal disc capable, under changing ambient temperatures, of snapping between positions of opposite concavity, in only one of which positions does it bear against said base, and further spring means normally urging said disc to the aforesaid second angular position, said further spring means being rendered ineffective, however, as long as said disc is in its position bearing against the base by the friction therebetween.

32. A control device as set forth in claim 19, in which the spring member comprises a dished composite thermostatic metal disc capable, under changing ambient temperatures, of snapping between positions of opposite concavity, in only one of which positions does it bear against said base, and further spring means normally urging said disc to the aforesaid first angular position.

33. A control device as set forth in claim 17, in which the control means comprise the relatively stationary and movable parts of a valve.

34. In an electric switch, a cup-like base member, a post axially mounted in said base, a knob mounted on said post in the open end of said base and rotatable with respect to said base, said knob having a recess in its inner end facing the base, said base having at least one bayonet-type slot in its inner wall, said slot having a deep portion and a shallow portion, said shallow portion being bottomed by a ledge, a dished resilient metal disc axially mounted on said post between the inner end of said knob and the base, said disc carrying at least one contact member, a cooperating contact member on the inside bottom of said base, said disc having at least one projection of cam shape extending from its periphery into said bayonet-type slot in said base, and a further projection extending into said recess in said knob, said contacts being resiliently juxtaposed by said disc when said cam-shaped projection is in the deeper portion of the bayonet-type slot, whereby, upon suitable manual rotation of said knob, said disc rotates to displace said contacts angularly, said cam-shaped projection then riding out of the deeper bayonet-type slot position on to the ledge bottoming the shallower slot portion to likewise displace said contacts axially.

35. In an electric switch, a cup-like base member, a post axially mounted in said base, a knob mounted on said post in the open end of said base and rotatable with respect to said base, said knob having a recess in its inner end facing the base, said base having at least one bayonet-type slot in its inner wall, said slot having a deep portion and a shallow portion, said shallow portion being bottomed by a ledge, a dished composite thermostatic metal disc axially mounted on said post between the inner end of said knob and the base, said disc having two positions of opposite concavity, between which it snaps in response to ambient temperature changes, said disc carrying at least one contact member, a cooperating contact member on the inside bottom of said base, said disc having at least one projection of cam shape extending from its periphery into said bayonet-type slot in said base, and a further projection extending into said recess in said knob, said contacts being resiliently juxtaposed by said disc when said cam-shaped projection is in the deeper portion of the bayonet-type slot and said disc is in its position of concavity facing the base, whereby, upon suitable manual rotation of said knob, said disc rotates to displace said contacts angularly, said cam-shaped projection then riding out of the deeper bayonet-type slot portion on to the ledge bottoming the shallower slot portion to likewise displace said contacts axially, said cam projection being raised above the level of said ledge when said disc is in its position of concavity away from the base.

36. In an electric switch, a cup-like base member, a post axially mounted in said base, a knob mounted on said post in the open end of said base and rotatable with respect to said base, said knob having a recess in its inner end facing the base, said base having at least one bayonet-type slot in its inner wall, said slot having a deep portion and a shallow portion, said shallow portion being bottomed by a ledge, a dished composite thermostatic metal disc axially mounted on said post between the inner end of said knob and the base, said disc having two positions of opposite concavity, between which it snaps in response to ambient temperature changes, said disc carrying at least one contact member, a cooperating contact member on the inside bottom of said base, said disc having at least one projection of cam shape extending from its periphery into said bayonet-type slot in said base, and a further projection extending into said recess in said knob, said contacts being resiliently juxtaposed by said disc when said cam-shaped projection is in the deeper portion of the bayonet-type slot and said disc is in its position of concavity facing the base, whereby, upon suitable manual rotation of said knob, said disc rotates to displace said contacts angularly, said cam-shaped projection then riding out of the deeper bayonet-type slot portion on to the ledge bottoming the shallower slot portion to likewise displace said contacts axially, said cam projection being raised above the level of said ledge when said disc is in its position of concavity away from the base, and spring means urging the disc to rotate into contact-juxtaposing position.

37. A thermostatic control comprising a thermostatic element that undergoes change of position in response to temperature change, a base, means mounting said element on said base permitting relative freedom of movement therebetween in addition to the movement consequent upon said change of position, said thermostatic element, however, in one of its positions frictionally engaging said base to resist said additional movement, and extraneous means disposing said element and said base to undergo said additional relative movement to a different stable position when said element is in a position other than its said engaging position.

38. A thermostatic control comprising a thermostatic element that undergoes change of position in response to temperature change, a base, means mounting said element on said base permitting relative freedom of movement therebetween in addition to the movement consequent upon said change of position, said thermostatic element, however, in one of its positions frictionally engaging said base to resist said additional movement, and extraneous means disposing said element and said base to undergo said additional relative movement to a different stable position when said element is in a position other than its said engaging position and control-effecting means determined as to condition by the relative positions of said base and said element.

39. A control element comprising a base, a spring member mounted thereon but movable with respect thereto, said member having at least one position of stability during which said member frictionally engages said base to resist movement with respect thereto and to make a circuit through the engaging portion, extraneous means disposing said member and said base to undergo relative movement to a different stable position, and controlled means controlled by said relative movement.

40. A control comprising a base, a thermostatic element mounted on said base, manually actuable extraneous means mounted on said base to undergo relative movement with respect thereto to a different stable position, controlled means actuated by said relative movement, said thermostatic element frictionally engaging said extraneous means to cause relative movement thereof upon temperature change beyond a predetermined point.

JOHN D. BOLESKY.